US012788185B2

(12) United States Patent
Mazzella et al.

(10) Patent No.: US 12,788,185 B2
(45) Date of Patent: Nov. 10, 2026

(54) CLEANABLE WHISK ATTACHMENTS FOR STAND MIXER APPLIANCES

(71) Applicant: Haier US Appliance Solutions, Inc., Wilmington, DE (US)

(72) Inventors: Joseph Mazzella, West Henrietta, NY (US); Katherine Beachler, Charlestown, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 659 days.

(21) Appl. No.: 18/359,314

(22) Filed: Jul. 26, 2023

(65) Prior Publication Data

US 2025/0031908 A1 Jan. 30, 2025

(51) Int. Cl.

| | |
|---|---|
| ***A47J 43/00*** | (2006.01) |
| ***A47J 43/07*** | (2006.01) |
| ***B01F 27/07*** | (2022.01) |
| ***B01F 27/13*** | (2022.01) |

(52) U.S. Cl.

CPC ......... *A47J 43/0711* (2013.01); *B01F 27/071* (2022.01); *B01F 27/13* (2022.01)

(58) Field of Classification Search

CPC .... A47J 43/0711; A47J 43/0705; A47J 43/07; A47J 43/0722; A47J 43/10; B01F 27/071

See application file for complete search history.

(56) References Cited

U.S. PATENT DOCUMENTS

| | | | | |
|---|---|---|---|---|
| 2,571,316 | A * | 10/1951 | Van Guilder | A47J 43/0711 416/126 |
| D560,433 | S | 1/2008 | Feil | |
| D650,230 | S | 12/2011 | Drees | |
| 10,004,359 | B2 | 6/2018 | Hoare et al. | |
| 2012/0170404 | A1 * | 7/2012 | Drees | B01F 27/96 366/204 |

FOREIGN PATENT DOCUMENTS

| | | |
|---|---|---|
| CN | 306774525 S | 8/2021 |
| KR | 3007684420000 | 10/2014 |

* cited by examiner

*Primary Examiner* — Anshu Bhatia

(74) *Attorney, Agent, or Firm* — Dority & Manning, P.A.

(57) ABSTRACT

A whisk is configured to attach to a stand mixer. The whisk includes a mounting socket at a top end of the whisk. The mounting socket extends along an axial direction from the top end of the whisk to a hub. The mounting socket is configured to attach to a shaft of the stand mixer. The whisk also includes a plurality of tines arrayed along a first portion and a second portion of a circumference of the hub, a first gap in a third portion of the circumference of the hub, and a second gap in a fourth portion of the circumference of the hub. The first and second gap extend between the first and second portion on opposing sides of the hub.

19 Claims, 6 Drawing Sheets

CLEANABLE WHISK ATTACHMENTS FOR STAND MIXER APPLIANCES

FIELD OF THE INVENTION

The present subject matter relates generally to whisk attachments for stand mixer appliances, particularly whisk attachments with improved cleanability.

BACKGROUND OF THE INVENTION

Stand mixers are generally used for performing automated mixing, churning, or kneading involved in food preparation. Typically, stand mixers include a motor configured to provide torque to one or more driveshafts. Users may connect various attachments to the one or more driveshafts to perform a variety of functions. The attachments, such as a beater, whisk, or hook, may be removably mounted to the driveshafts, such that the attachments may rotate within a bowl to beat, whisk, knead, etc. material within the bowl.

The attachments may be shaped in various ways to perform the desired operation, such as a whisk having multiple tines spaced apart in order to mix ingredients together quickly or to incorporate air into the ingredients being whisked. The various shapes of attachments can often be difficult to clean after use, even requiring deformation of the attachment in order to properly clean the attachment. An attachment for a stand mixer that is easily cleaned without requiring deformation of the attachment would be advantageous.

BRIEF DESCRIPTION OF THE INVENTION

Aspects and advantages of the invention will be set forth in part in the following description, or may be apparent from the description, or may be learned through practice of the invention.

In one example embodiment, a stand mixer defines a vertical direction, a lateral direction, and a transverse direction. The vertical direction, the lateral direction, and the transverse direction are mutually perpendicular. The stand mixer includes a base, a support column attached to the base and extending upwardly from the base, and a head attached to an upper end of the support column and extending from the support column above the base. The head includes a drivetrain inside an interior of the head. The stand mixer also includes a shaft positioned at a bottom end of the head and extending downwardly between the head and the base. The shaft is rotatably connected to the drivetrain in the head, and the drivetrain is configured to rotate the shaft about the vertical direction. A whisk is configured to couple to the shaft. The whisk defines an axial direction, a radial direction perpendicular to the axial direction, and a circumferential direction extending around the axial direction. The whisk includes a mounting socket at a top end of the whisk. The mounting socket extends along the axial direction from the top end of the whisk to a hub. The mounting socket is configured to attach to the shaft of the stand mixer. The whisk also includes a plurality of tines arrayed along a first portion and a second portion of a circumference of the hub. Each tine of the plurality tines includes a first radial segment extending out from the first portion of the hub along the radial direction, a first linear segment extending approximately along the axial direction, a first fillet between the first radial segment and the first linear segment, and an arcuate segment curving radially inward to an inflection point at a bottom end of the whisk. The arcuate segment of each tine of the plurality tines curves radially outward from the inflection point of the arcuate segment to a second linear segment of each tine of the plurality tines. The second linear segment of each tine of the plurality tines extends from the arcuate segment to a second fillet. The second fillet extends between the second linear segment and a second radial segment. The second radial segment extends inward along the radial direction to the hub. Each second radial segment ends at the second portion of the circumference of the hub at an opposing side of the hub from a respective first radial segment. The whisk also includes a first gap in a third portion of the circumference of the hub, and a second gap in a fourth portion of the circumference of the hub. The first and second gap extend between the first and second portion on opposing sides of the hub.

In another example embodiment, a whisk is configured to attach to a stand mixer. The whisk defines an axial direction, a radial direction perpendicular to the axial direction, and a circumferential direction extending around the axial direction. The whisk includes a mounting socket at a top end of the whisk. The mounting socket extends along the axial direction from the top end of the whisk to a hub. The mounting socket is configured to attach to a shaft of the stand mixer. The whisk also includes a plurality of tines arrayed along a first portion and a second portion of a circumference of the hub. Each tine of the plurality tines includes a first radial segment extending out from the first portion of the hub along the radial direction, a first linear segment extending approximately along the axial direction, a first fillet between the first radial segment and the first linear segment, and an arcuate segment curving radially inward to an inflection point at a bottom end of the whisk. The arcuate segment of each tine of the plurality tines curves radially outward from the inflection point of the arcuate segment to a second linear segment of each tine of the plurality tines. The second linear segment of each tine of the plurality tines extends from the arcuate segment to a second fillet. The second fillet extends between the second linear segment and a second radial segment. The second radial segment extends inward along the radial direction to the hub. Each second radial segment ends at the second portion of the circumference of the hub at an opposing side of the hub from a respective first radial segment. The whisk also includes a first gap in a third portion of the circumference of the hub, and a second gap in a fourth portion of the circumference of the hub. The first and second gap extend between the first and second portion on opposing sides of the hub.

In another example embodiment, a whisk is configured to attach to a stand mixer. The whisk defines an axial direction, a radial direction perpendicular to the axial direction, and a circumferential direction extending around the axial direction. The whisk includes a mounting socket at a top end of the whisk. The mounting socket extends along the axial direction from the top end of the whisk to a hub. The mounting socket is configured to attach to a shaft of the stand mixer. The whisk also includes a plurality of tines arrayed along a first portion and a second portion of a circumference of the hub, a first gap in a third portion of the circumference of the hub, and a second gap in a fourth portion of the circumference of the hub. The first and second gap extend between the first and second portion on opposing sides of the hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
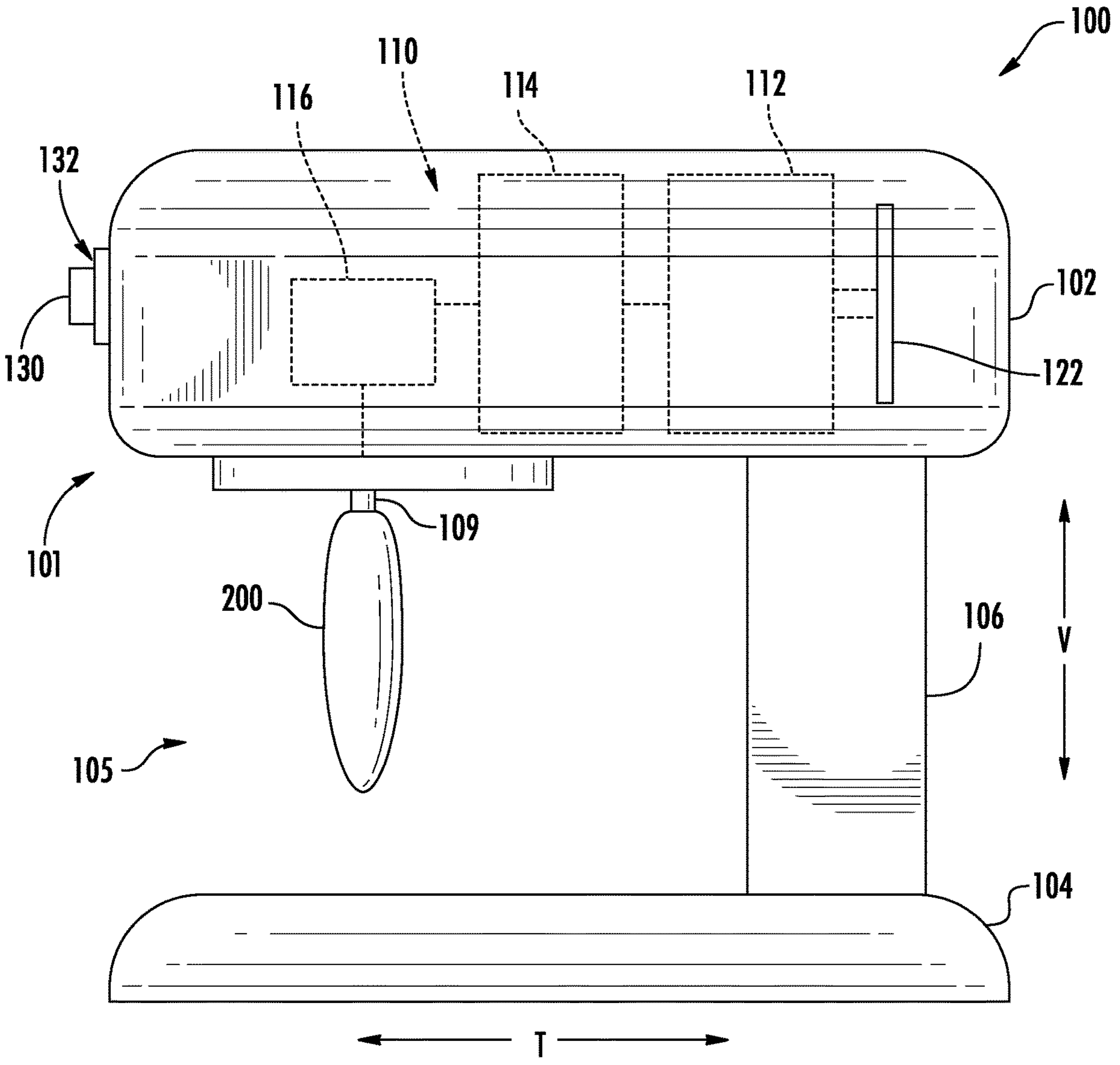
FIG. 1 provides a side elevation view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Figure 2:
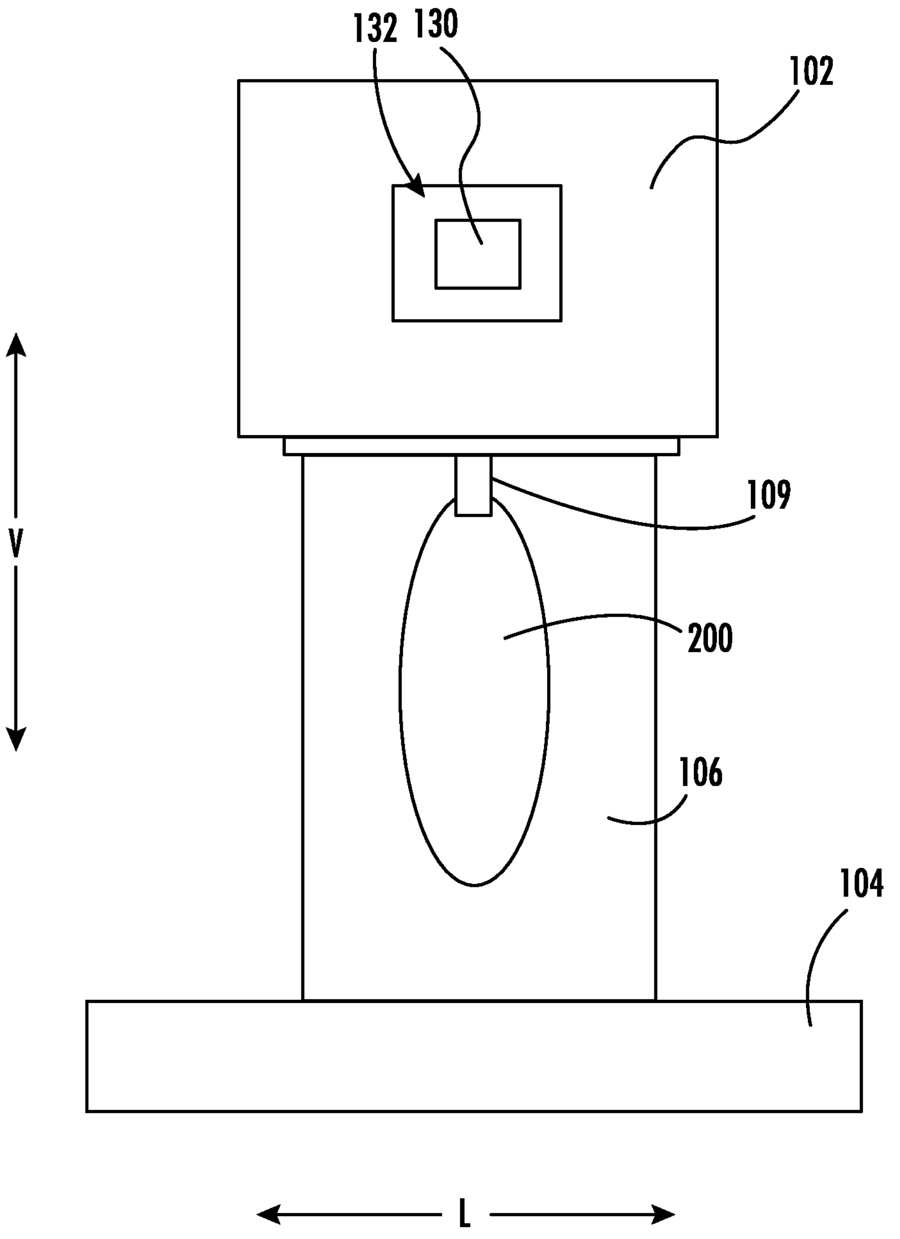
FIG. 2 provides a front elevation view of the stand mixer of FIG. 1, according to aspects of the present disclosure.
Figure 3:
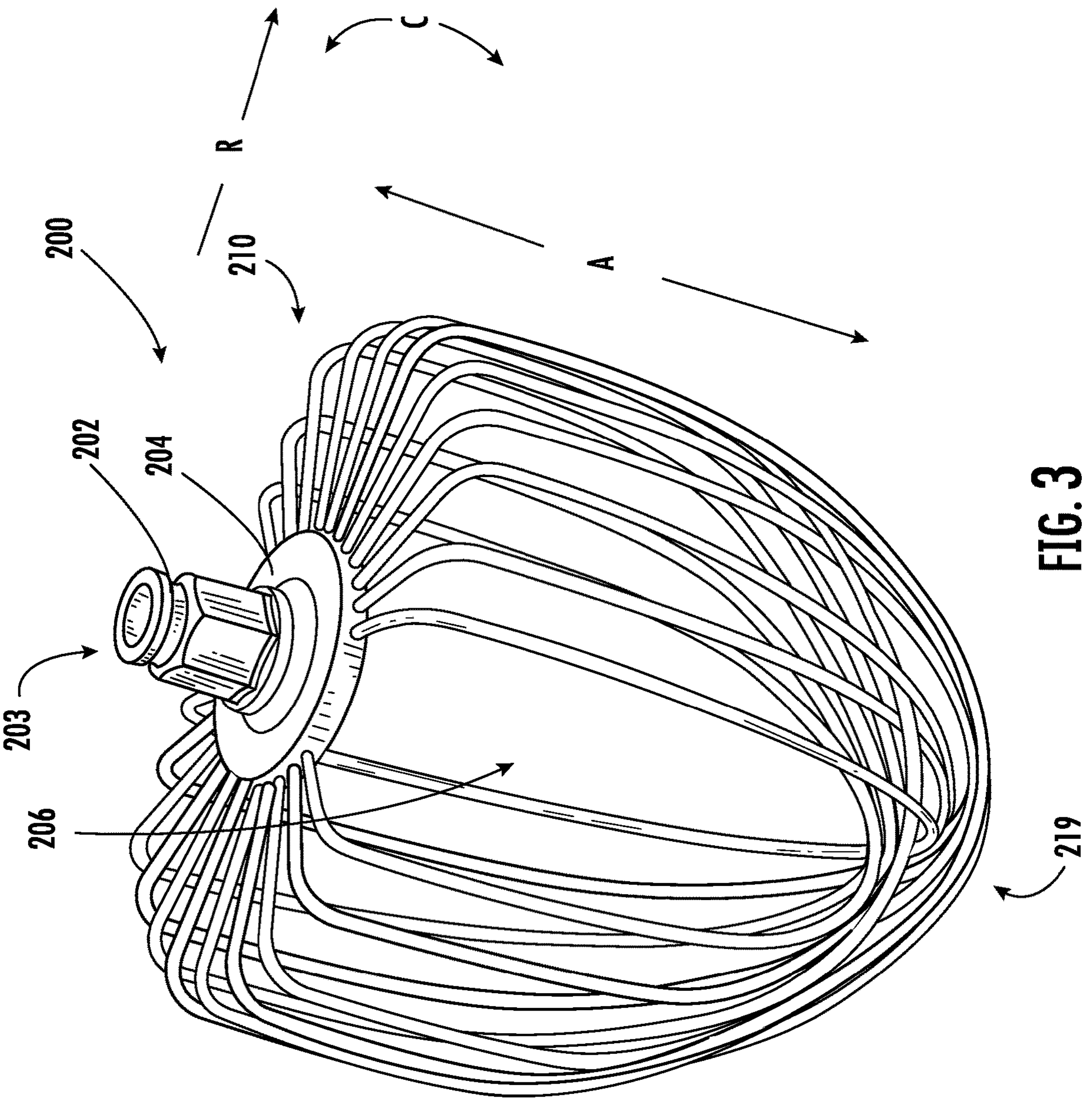
FIG. 3 provides a perspective view of an example embodiment of a whisk attachment for the stand mixer of FIG. 1, according to aspects of the present disclosure.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 may define a vertical direction V and a transverse direction T, which are mutually perpendicular to one another. FIG. 2 provides a front elevation view of stand mixer 100, in which stand mixer 100 may define a vertical direction V and a lateral direction L, which are mutually perpendicular to one another. It should be understood that these directions are presented for example purposes only, and that relative positions and locations of certain aspects of stand mixer 100 may vary according to specific embodiments, spatial placement, or the like.

Stand mixer 100 may include a casing 101. Casing 101 may include a motor housing 102, a base 104, and a column 106. Motor housing 102 may house various mechanical and/or electrical components of stand mixer 100, which will be described in further detail below. For example, as shown in FIG. 1, a motor 112, a reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include gearbox 114, bevel gearbox 116, etc. An opening 132 for a horizontal accessory shaft 130 may align with the rotational axis of motor 112. Mixer shaft 109 may be positioned above mixing zone 105 on motor housing 102, and an attachment 200, such as a beater, whisk, or hook, may be removably mounted to mixer shaft 109. Attachment 200 may rotate within a bowl (not shown) in mixing zone 105 to beat, whisk, knead, etc. material within the bowl during operation of motor 112. Attachment 200 will be further described hereinbelow.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 4:
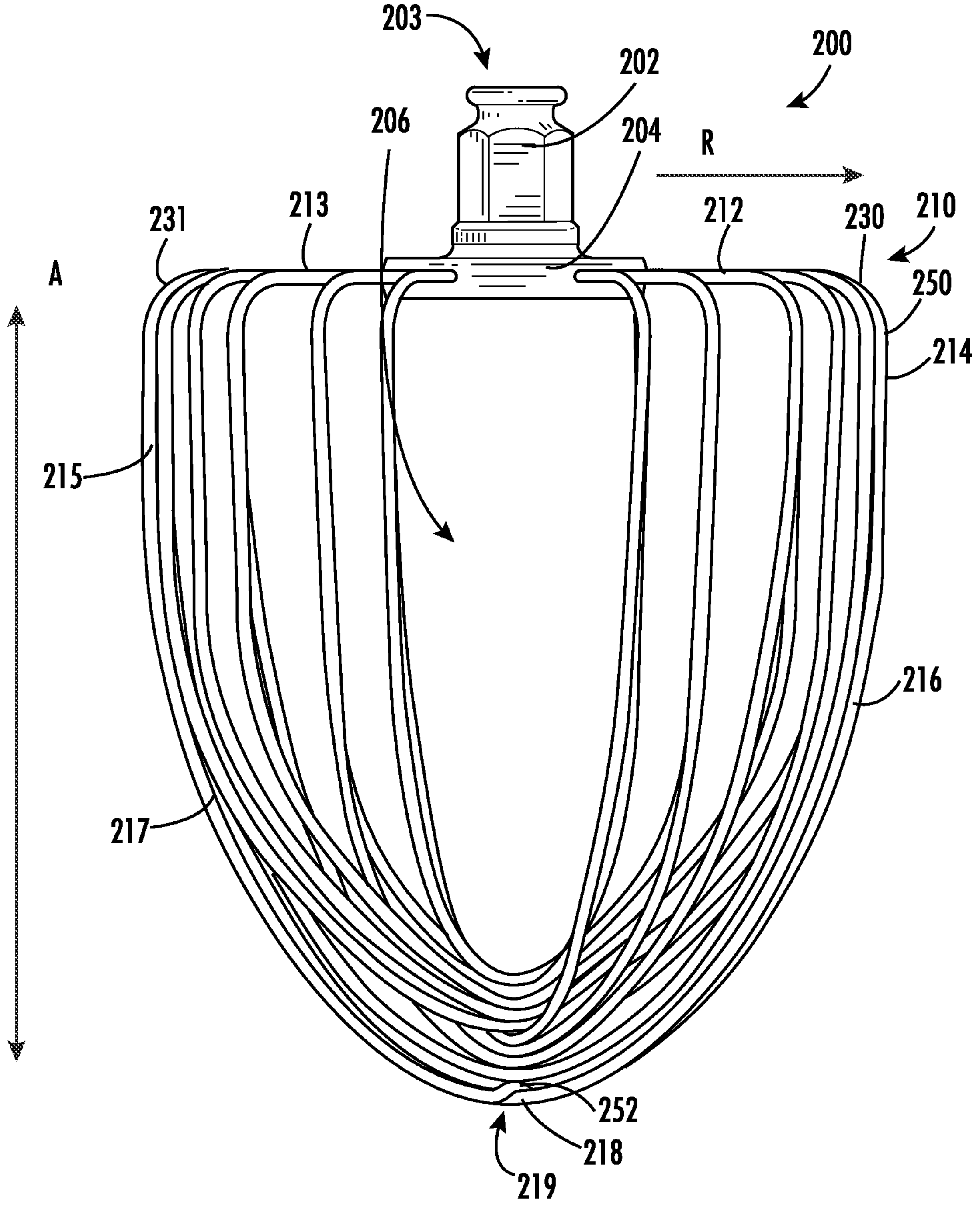
FIG. 4 provides a side elevation view of the example whisk attachment of FIG. 2, according to aspects of the present disclosure.
Figure 5:
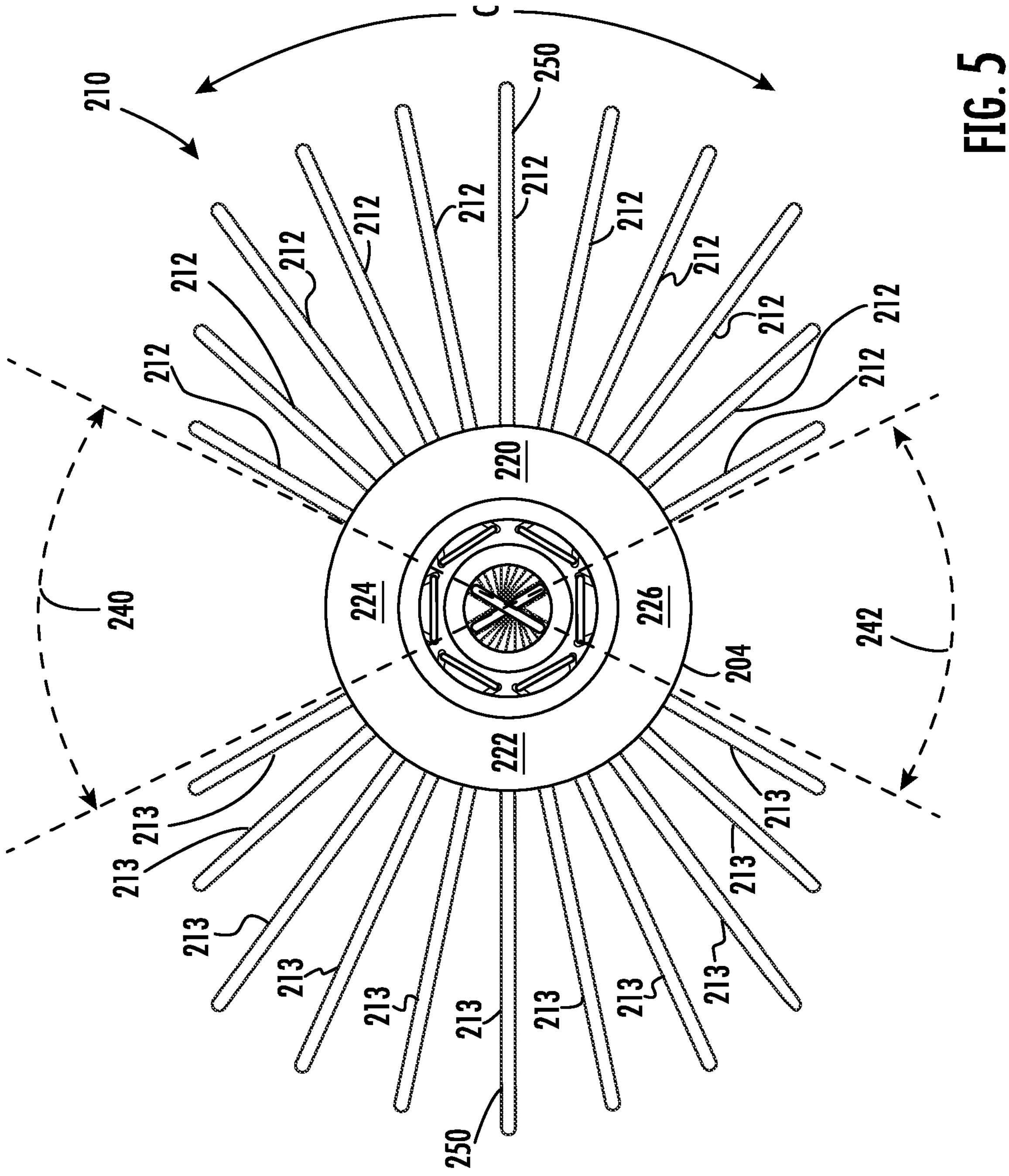
FIG. 5 provides a top view of the example whisk attachment of FIG. 2, according to aspects of the present disclosure.

As shown in FIGS. 3-6, stand mixer 100 may include an attachment 200. In the present example embodiment, attachment 200 is a whisk and will be referred to herein as whisk 200. Whisk 200 defines an axial direction A, a radial direction R, perpendicular to the axial direction, and a circumferential direction C extending around the axial direction. Whisk 200 may include a mounting socket 202 at the top end 203 of the whisk. In general, mounting socket 202 may be configured to attach to the shaft 109 of stand mixer 100. Particularly, mounting socket 202 may extend along the axial direction A from top end 203 of whisk 200 to a hub 204. In general, hub 204 may be a cylindrical housing for a plurality of tines 210. Hub may be generally divided into four (4) portions, e.g., first portion 220, second portion 222, third portion 224, and fourth portion 226 as seen in FIG. 5.

In general, the plurality of tines 210 may be arrayed along the first portion 220 and the second portion 222 of a circumference of hub 204. For example, each tine of the plurality of tines 210 may be equidistantly spaced twelve degrees (12°) apart in the circumferential direction C, from each tine within the first and second portion 220, 222. As seen in FIG. 4, each tine of the plurality tines 210 may include a first radial segment 212 extending outwards from the first portion 220 of the hub 204 along the radial direction R. Further, each tine of the plurality tines 210 may include a first linear segment 214 extending approximately along the axial direction A, and a first fillet 230 between the first radial segment 212 and the first linear segment 214. In particular, each tine of the plurality of tines 210 may extend along the axial direction A, no less than one-third (⅓) of a total axial length of the plurality of tines 210. Such axial extent of the tines may advantageously provide increased internal volume within the interior 206 of the whisk 200, e.g., as compared to a whisk design with a greater curvature or taper. Moreover, each tine of the plurality tines 210 may include a first arcuate segment 216 extending from the first linear segment 214 curving radially inward to an inflection point 218 at a bottom end 219 of whisk 200.

In general, a second arcuate segment 217 of each tine of the plurality tines 210 may curve radially outward from inflection point 218 to a second linear segment 215 of each tine of the plurality tines 210. The second linear segment 215 of each tine of the plurality tines 210 extend from the second arcuate segment 217 to a second fillet 232. The second fillet 232 may extend between the second linear segment 215 and a second radial segment 213. The second radial segment 213 may extend inward along the radial direction R, to hub 204. The second radial segment 213 may end, or terminate, at the second portion 222 of the circumference of hub 204 at an opposing side of hub 204 from the first radial segment 212, as seen in FIG. 5.

Furthermore, whisk 200 may include a first gap 240 defined in third portion 224 of the circumference of hub 204, and a second gap 242 defined in the fourth portion 226 of the circumference of hub 204. The first and second gap 240, 242 may extend between the first and second portion 220, 222 on opposing sides of the hub, with respect to the circumferential direction C. For example, the first and second gap 240, 242 may be no less than two centimeters (2 cm) and no more than three centimeters (3 cm) in the circumferential direction C. Particularly, first and second gaps 240, 242 in the plurality of tines 210 along with the curvature of the plurality of tines 210 of the whisk 200 form an oval-shaped hole through an interior 206 of whisk 200. As such, first and second gaps 240, 242 may increase the cleanability of whisk 200 than other attachments without first and second gaps 240, 242, because various kitchen tools may be inserted into the interior 206 of whisk 200 for cleaning, e.g., to remove or retrieve a finished product from within the interior 206 of the whisk 200. Additionally, such tools, e.g, spoons, spatulas, etc., may be inserted into the interior 206 of whisk 200 to scoop out the finished product without deforming (e.g., bending) or displacing any of the tines.

Figure 6:
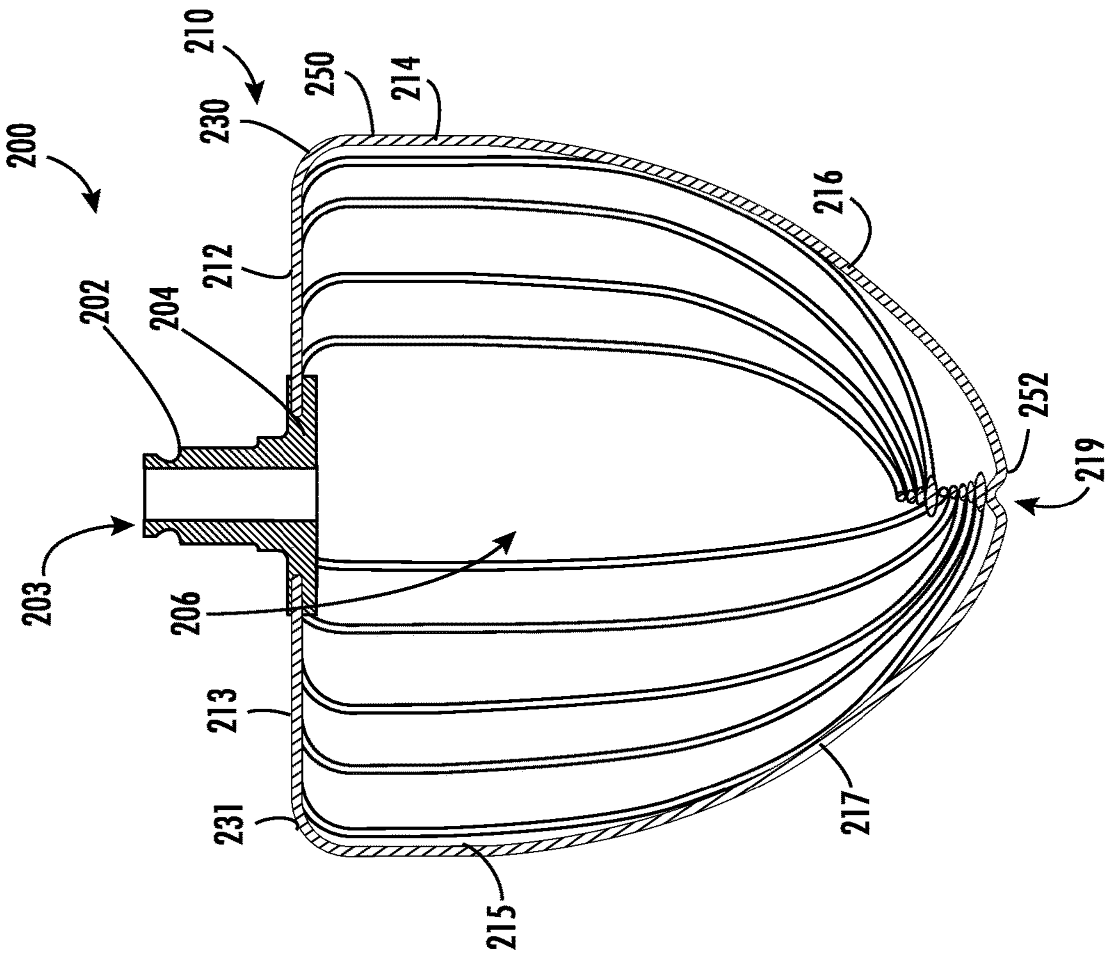
FIG. 6 provides a section view of the example whisk attachment of FIG. 2, according to aspects of the present disclosure.

In the present example embodiment, the plurality of tines 210 includes a central tine 250 that defines the center of the first and second portions 220, 222. Central tine 250 may be the longest tine of the plurality of tines 210, e.g., central tine may extend the longest in the radial direction R and axial direction A. In some example embodiments, central tine 250 may include a snap bend 252, as seen in FIG. 6. In general, snap bend 252 snaps over one tine of the plurality of tines 210 at the inflection point 218. Particularly, snap bend 252 provides structure and rigidity to whisk 200 when snapped to another tine of the plurality of tines 210.

As may be seen from the above, gaps in the plurality of tines of the whisk form an ovalized hole through the center of the whisk. The spacing of these tines and accompanying centralized hole allows ingredients to easily fall out and/or be removed from the interior of the whisk. This provides improved mixing performance, cleanability and volumetric benefits. Correspondingly, this design provides better accessibility for kitchen tools, such as scrapers, spatulas, or spoons to be inserted into the interior of the whisk for cleaning.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer defining a vertical direction, a lateral direction, and a transverse direction, wherein the vertical direction, the lateral direction, and the transverse direction are mutually perpendicular, the stand mixer comprising:

- a base;
- a support column attached to the base and extending upwardly from the base;
- a head attached to an upper end of the support column and extending from the support column above the base, the head comprising a drivetrain inside an interior of the head;
- a shaft positioned at a bottom end of the head and extending downwardly between the head and the base, the shaft rotatably connected to the drivetrain in the head, the drivetrain configured to rotate the shaft about the vertical direction; and
- a whisk configured to couple to the shaft, the whisk defining an axial direction, a radial direction perpendicular to the axial direction, and a circumferential direction extending around the axial direction, the whisk comprising:
  - a mounting socket at a top end of the whisk, the mounting socket extending along the axial direction from the top end of the whisk to a hub, the mounting socket configured to attach to the shaft of the stand mixer;
  - a plurality of tines arrayed along a first portion and a second portion of a circumference of the hub, each tine of the plurality of tines comprising a first radial segment extending out from the first portion of the hub along the radial direction, a first linear segment extending approximately along the axial direction, a first fillet between the first radial segment and the first linear segment, and an arcuate segment curving radially inward to an inflection point at a bottom end of the whisk, the arcuate segment of each tine of the plurality tines curving radially outward from the inflection point of the arcuate segment to a second linear segment of each tine of the plurality tines, the second linear segment of each tine of the plurality tines extending from the arcuate segment to a second fillet, the second fillet extending between the second linear segment and a second radial segment, the second radial segment extending inward along the radial direction to the hub, wherein each second radial segment ends at the second portion of the circumference of the hub at an opposing side of the hub from a respective first radial segment;
  - a first gap in a third portion of the circumference of the hub; and
  - a second gap in a fourth portion of the circumference of the hub,
  - wherein the first and second gap extend between the first and second portion on opposing sides of the hub, and
  - wherein the first gap and the second gap form an ovalized hole through an interior of the whisk, the ovalized hole extending unobstructed from the hub to the inflection point.

2. The stand mixer of claim 1, wherein the plurality of tines comprises a central tine defining the center of the first and second portions, with respect to the circumferential direction.

3. The stand mixer of claim 1, wherein the plurality of tines extend along the axial direction no less than one-third of a total axial length of the plurality of tines.

4. The stand mixer of claim 1, wherein each tine of the plurality of tines are equidistantly spaced twelve degrees apart in the circumferential direction from each tine within the first and second portion.

5. The stand mixer of claim 1, wherein the first and second gap are no less than two centimeters and no more than three centimeters in the circumferential direction.

6. The stand mixer of claim 2, wherein the central tine comprises a snap bend.

7. The stand mixer of claim 6, wherein the snap bend snaps over one tine of the plurality of tines at the inflection point.

8. A whisk configured to attach to a stand mixer, the whisk defining an axial direction, a radial direction perpendicular to the axial direction, and a circumferential direction extending around the axial direction, the whisk comprising:

- a mounting socket at a top end of the whisk, the mounting socket extending along the axial direction from the top end of the whisk to a hub, the mounting socket configured to attach to a shaft of the stand mixer;
- a plurality of tines arrayed along a first portion and a second portion of a circumference of the hub, each tine of the plurality tines comprising a first radial segment extending out from the first portion of the hub along the radial direction, a first linear segment extending approximately along the axial direction, a first fillet between the first radial segment and the first linear segment, and an arcuate segment curving radially inward to an inflection point at a bottom end of the whisk, the arcuate segment of each tine of the plurality tines curving radially outward from the inflection point of the arcuate segment to a second linear segment of each tine of the plurality tines, the second linear segment of each tine of the plurality tines extending from the arcuate segment to a second fillet, the second fillet extending between the second linear segment and a second radial segment, the second radial segment extending inward along the radial direction to the hub, wherein each second radial segment ends at the second portion of the circumference of the hub at an opposing side of the hub from a respective first radial segment;
- a first gap in a third portion of the circumference of the hub; and
- a second gap in a fourth portion of the circumference of the hub,
- wherein the first and second gap extend between the first and second portion on opposing sides of the hub, and
- wherein the first gap and the second gap form an ovalized hole through an interior of the whisk, the ovalized hole extending unobstructed from the hub to the inflection point.

9. The whisk of claim 8, wherein the plurality of tines comprises a central tine defining the center of the first and second portions, with respect to the circumferential direction.

10. The whisk of claim 8, wherein the plurality of tines extend along the axial direction no less than one-third of a total axial length of the plurality of tines.

11. The whisk of claim 8, wherein each tine of the plurality of tines are equidistantly spaced twelve degrees apart in the circumferential direction from each tine within the first and second portion.

12. The whisk of claim 8, wherein the first and second gap are no less than two centimeters and no more than three centimeters in the circumferential direction.

13. The whisk of claim 9, wherein the central tine comprises a snap bend.

14. The whisk of claim 13, wherein the snap bend snaps over one tine of the plurality of tines at the inflection point.

15. A whisk configured to attach to a stand mixer, the whisk defining an axial direction, a radial direction perpendicular to the axial direction, and a circumferential direction extending around the axial direction, the whisk comprising:

a mounting socket at a top end of the whisk, the mounting socket extending along the axial direction from the top end of the whisk to a hub, the mounting socket configured to attach to a shaft of the stand mixer;

a plurality of tines arrayed along a first portion and a second portion of a circumference of the hub;

a first gap in a third portion of the circumference of the hub; and a second gap in a fourth portion of the circumference of the hub, wherein the first and second gap extend between the first and second portion on opposing sides of the hub, and wherein the first gap and the second gap form an ovalized hole through an interior of the whisk, the ovalized hole extending unobstructed from the hub to the inflection point.

16. The whisk of claim 15, wherein the plurality of tines comprises a central tine defining the center of the first and second portions, with respect to the circumferential direction.

17. The whisk of claim 15, wherein the plurality of tines extend along the axial direction no less than one-third of a total axial length of the plurality of tines.

18. The whisk of claim 15, wherein each tine of the plurality of tines are equidistantly spaced twelve degrees apart in the circumferential direction from each tine within the first and second portion.

19. The whisk of claim 15, wherein the first and second gap are no less than two centimeters and no more than three centimeters in the circumferential direction.

* * * * *